United States Patent [19]

Cummins

[11] Patent Number: 4,840,764
[45] Date of Patent: Jun. 20, 1989

[54] CONTROLLED WALL CASTING PROCESS

[76] Inventor: Richard F. Cummins, 941 Alabama, Lawrence, Kans. 66044

[21] Appl. No.: 256,633

[22] Filed: Oct. 12, 1988

[51] Int. Cl.$^4$ ............................................. B29C 39/18
[52] U.S. Cl. ................................... 264/102; 264/221; 264/225; 264/226; 264/227; 264/275
[58] Field of Search ...................... 264/16, 17, 18, 19, 264/102, 215, 220, 221, 225, 226, 227, 255, 256, 271.1, 274, 275, 279.1, 317, DIG. 33, DIG. 64; 425/175, 177, 178

[56] References Cited

U.S. PATENT DOCUMENTS

| | | | |
|---|---|---|---|
| 2,460,242 | 1/1949 | Renaud | 264/227 |
| 3,548,050 | 12/1970 | Mozer | 264/227 |
| 4,289,724 | 9/1981 | Baynard | 264/225 |
| 4,650,625 | 3/1987 | Pentlow | 264/223 |

*Primary Examiner*—Jan H. Silbaugh
*Assistant Examiner*—Nick Krisch
*Attorney, Agent, or Firm*—Dennison, Meserole, Pollack & Scheiner

[57] ABSTRACT

A method for forming a cast replica of an article, including: forming an outer mold around the article with a first molding material, the outer mold having an inner surface substantially conforming to the outer surface of the article; separating the article from the outer mold; applying to the outer mold on its inner surface a predetermined thickness of a second molding material which is separable from the outer mold, the second molding material defining a hollow space at the interior thereof; filling the hollow space with a third molding material separable from the second molding material; allowing the third molding material to cure to form an inner mold; separating the second molding material from the outer mold and the inner mold; locating the inner mold or a reproduction thereof within the outer mold with a space between said outer mold and the inner mold representing the predetermined thickness; filling the space between the inner mold and the outer mold with a fourth molding material; allowing the fourth molding material to cure, forming the cast replica, and separating the cast replica from the outer mold.

20 Claims, 2 Drawing Sheets

CONTROLLED WALL CASTING PROCESS

BACKGROUND OF THE INVENTION

1. Field of the Invention

The invention relates to the field of casting objects with synthetic resins, particularly art objects.

2. Description of the Prior Art

Historically, the highest quality sculptural casts have been produced by the lost wax process, in which a wax replica of an object is encased in a mold of refractory material. The wax is then burned out, and molten material is poured into the space previously occupied by the wax. While the results of the lost wax process are aesthetically respected, the process is quite expensive in terms of labor, equipment and materials.

A market definitely exists for sculptural reproductions which can be made at a reasonable cost. The use of resins for casting would certainly reduce the cost, but the results of resin casting have been unsatisfactory. While very small objects may be cast with resin, difficulties exist with casting pieces having a thickness greater than about 3 inches due to crazing and cracking of the cast material associated with heat build-up during the curing process. This problem is exacerbated as the mass of the cast object increases.

As one solution to the problems of resin casting, multi-piece fiberglass reproduction is practiced. However, fiberglass has inherent problems of loss of surface detail, structural deformation, non-homogenous pigmentation, visible seams and high labor costs.

Another method for forming a cast reproduction of an article is disclosed in U.S. Pat. No. 4,650,625 to Pentlow. According to the Pentlow patent, a reproduction of a shoe is formed by casting a master mold around the shoe form, and securing the master mold in a mold casing for injection molding. The shoe form is replaced with a last, and a shoe is formed by injection molding in the space between the last and the master mold.

In U.S. Pat. No. 4,289,724 to Baynard, a reproduction of a tree trunk is formed by casting concrete between a mold conforming to the outer surface of the tree truck, and a removable central core.

SUMMARY OF THE INVENTION

It is therefore an object of the invention to provide a low cost method for producing monolithic cast reproductions of art and other objects from synthetic resins, epoxies and other materials, where excessive heat generation due to increasing volume or mass is a problem.

In order to achieve this and other objects of the invention, the present invention encompasses a method for forming a cast replica of an article, comprising forming an outer mold around the article with a first molding material, the outer mold having an inner surface substantially conforming to the outer surface of the article. The article is then separated from the outer mold, and a pattern is made of an anticipated non-cast space to be located inside the final cast article. This is done by applying to the inner surface of the outer mold, a second molding material which, when the mold is closed, defines a hollow space at its interior. This hollow space is subsequently filled with a third molding material which cures to form an inner mold. The second molding material is then separated form the outer mold and the inner mold, and the inner mold or a reproduction is fixed within the outer mold. A space is left between the inner mold and outer mold which represents the predetermined thickness, and this space is filled with a fourth molding material which cures to form the cast replica of controlled wall thickness. This replica is separated from the outer mold.

Thus, the invention involves the formation of objects having controlled wall thickness, which allows the use of resin casting without crazing and cracking which are associated with resin casting of objects of considerable mass. If desired, the inner mold of the invention may be reproduced many times in order to produce multiple castings of the desired replica from a single outer mold.

DESCRIPTION OF THE PREFERRED EMBODIMENTS

Figure 1:
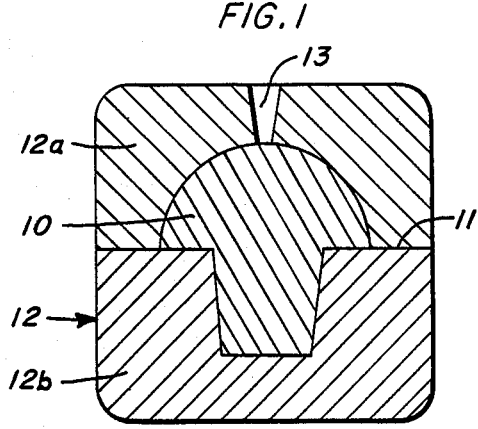
FIGS. 1 through 5, show in cross-section the sequence of steps used in molding according to the invention.

The invention will now be explained with reference to the drawing Figures.

The process of the invention will be used to form a reproduction of a clay original shown as 10 in FIG. 1. In order to do so, an outer mold 12 is formed around original 10, with the inner surface of the outer mold accurately conforming to the outer surface of the original. The outer mold may be formed of any material compatible with the original and with the material to be used for casting the reproduction. The material forming the outer mold should also provide an accurate reproduction of the original. Suitable materials include plaster, polyester resin, fiberglass reinforced polyester resin, epoxies, silicone compounds and certain polyurethanes. These may be used alone or in conjunction with each other or other materials and they may be reinforced. The outer mold may be rigid or flexible or a combination of the two with, for example, an outer rigid fiberglass shell and flexible rubber liner. Flexible molds are preferred when there are many undercuts in the mold. As shown in FIG. 1, outer mold 12 is split longitudinally along line 11 into two parts 12a and 12b, but may also be formed as a single piece or divided into more than two pieces. The mold includes a pouring channel 13.

Figure 2:
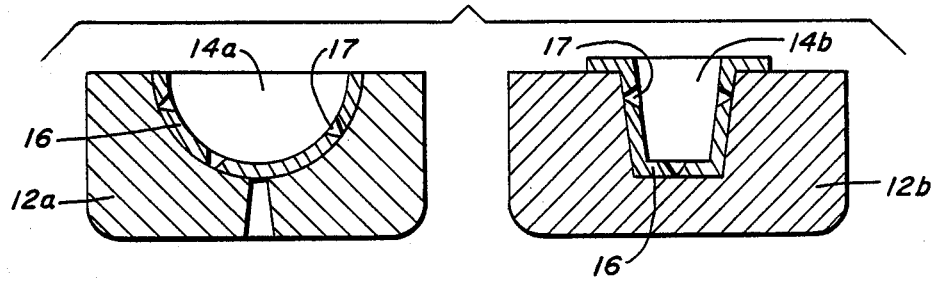

As shown in FIG. 2, the mold is split and the original 10 is removed leaving spaces 14a and 14b in the shape of the original. A blanket 16 of clay, wax, plaster or some other material is laid onto the inner surfaces of the outer molds in spaces 14a and 14b. The thickness of blanket 16 represents what will ultimately be the thickness of the cast wall; generally it will be in the range of 2 to 20 mm, although greater thicknesses are possible, depending on the application. Thickness up to about 75 mm can possibly be used. A number of small cuts or keys 17 is made through the blanket at appropriate points to assure proper location of the ultimate cores in the outer molds. These keys are referred to as core prints.

Figure 3:
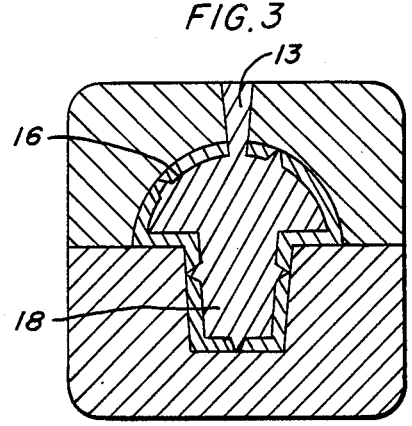

As shown in FIG. 3, the mold sections are then fitted together with the blanket in place, and the remainder of space 14 is filled through channel 13, with a material which will not bond to the blanket material, but which will copy the inside surface of the blanket, and form an inner mold 18. The inner mold may be formed by such materials as polyurethanes, fiberglass reinforced polyester resin, and epoxies for small pieces, and plaster or expanding foam for larger pieces. After curing, the mold is opened and the inner mold 18 is removed. This inner mold may be used to form cast replicas, or may itself serve as a pattern for preparing a plurality of inner mold reproductions, as will be explained hereinafter. The blanket layer 16 is removed from outer mold 12 and is discarded. There are now two molds, and outer mold 12 and a smaller inner mold 18.

Figure 4:
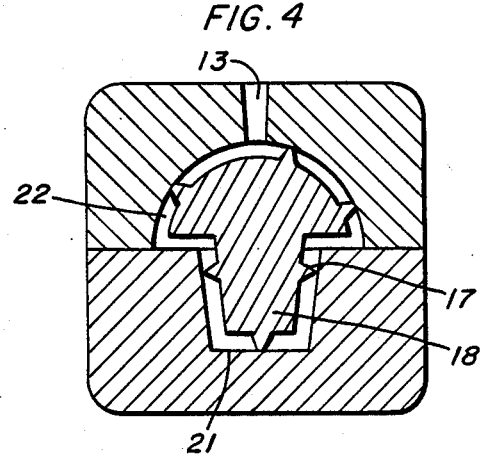

Next, as shown in FIG. 4, inner mold 18 is located within outer mold 12, suspended therein by keys 17. The outer mold is assembled and a casting material is poured through channel 13 into the space between the inner and outer molds. This casting material is generally a synthetic resin such as a polyester or epoxy resin, which may be reinforced with fiberglass or other suitable material. Preferably, the filling operation takes place within a vacuum chamber, under full or partial vacuum, which allows complete filling of detail undercuts in the mold without the use of gates and runners. Use of a vacuum chamber also allows for removal of air from the resin itself. In order to remove the cast reproduction from the outer mold, a parting layer 21 such as a wax coating may be applied to the inner surface of the outer mold prior to adding the casting material 22.

Figure 5:
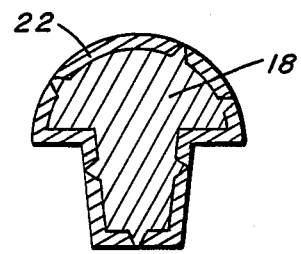

Because the layer being cast 22 is relatively thin, heat generation does not pose a problem with the cast object. After layer 22 has cured, the outer mold is opened, and cast replica 22 shown in FIG. 5 is removed. While the cast replica may be split and inner mold 18 removed therefrom, it is preferred that the replica remain intact.

Figure 6:
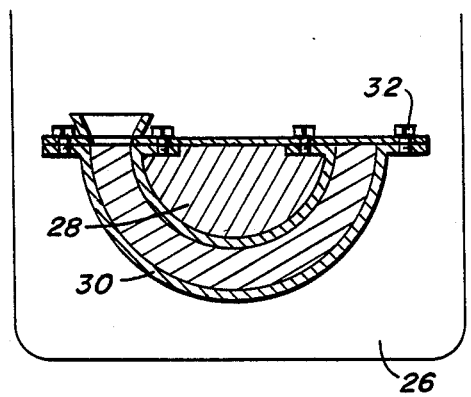
FIGS. 6 and 7 show in cross-section alternate configurations for attaching an inner mold to an outer mold according to the invention.
Figure 7:
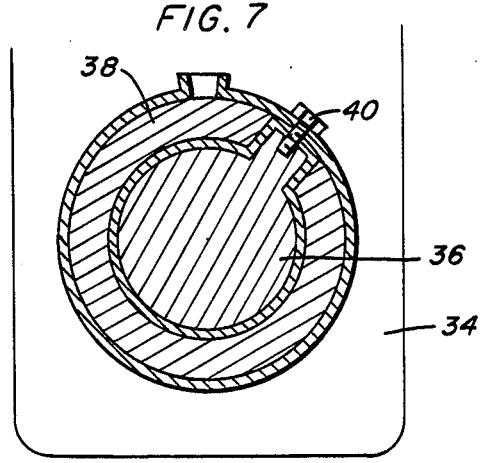

A number of other devices may be used to secure the inner mold within the outer mold. As shown in FIG. 6, inner mold 28 is bolted directly to outer mold 26 with bolts 32, layer 30 is then cast. FIG. 7 utilizes a similar bolting arrangement, with outer mold 34 bolted to inner mold 36 with bolts 40; layer 38 is cast.

It is further contemplated that the inner mold may be cast without keys, and keys may be bonded onto the inner mold afterward, before the casting of the final article. This has advantages when the inner mold is to be duplicated, since it allows for less expensive rigid casts of the inner mold to be made.

As noted, the inner mold may itself by used as a pattern to form many inner mold reproductions, each of which can be used to form a cast of the desired replica. Generally, the inner molds which are reproduced will be of the same material and color as the final cast object, in order to ensure the homogeneity and strength of the cast. Reinforcing materials may also be used in the core in order to enhance the structural integrity of the final cast.

Figure 8:
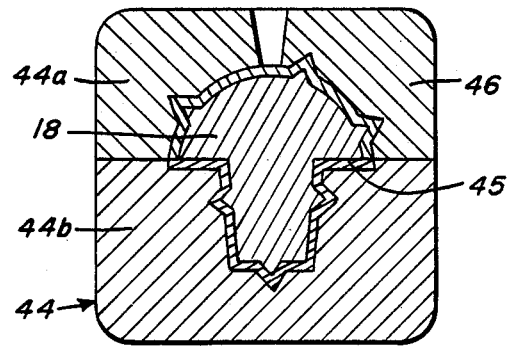
FIGS. 8 through 11 show in cross-section, embodiments for forming reproductions of an inner mold.
Figure 9:
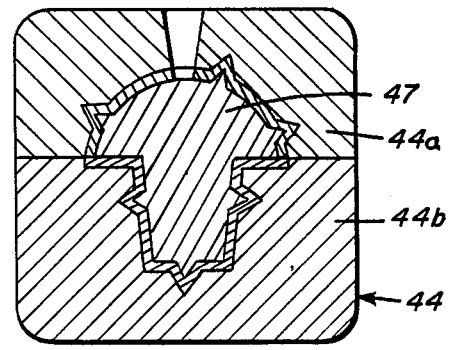
Figure 10:
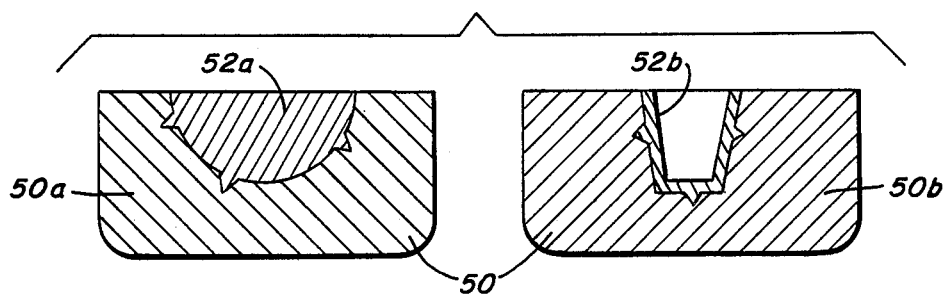
Figure 11:
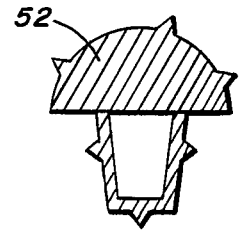

The inner mold or core is reproduced by forming a mold therearound, much as the mold shown in FIG. 1 is formed around the original object. If the core is of a sufficiently small section, it can then be cast as a single piece from a resin or fiberglass reinforced resin. As shown in FIG. 8, mold 44 with mold halves 44a and 44b are used to form a cast around inner mold 18 by conventional techniques. The mold shown in FIG. 8 is a composite, with a flexible rubber layer 45 formed around inner mold 18 and a rigid fiberglass and resin layer 46 formed around the rubber layer. The core 47 may be cast from mold 44 in a single piece, as shown in FIG. 9, or, if the core is too large to cast in one piece, the mold may be split into as many sections as necessary. As shown in FIG. 10, mold 50 is split into sections 50a and 50b and the inner mold sections are reproduced separately. The sections may be reproduced as solid pieces as shown in FIG. 9, or they can be reproduced as hollow pieces by applying a suitable molding material as a blanket layer to one or more mold sections. Further, the inner mold reproduction may consist of one or more solid sections combined with one or more hollow sections. As shown in FIG. 10, inner mold section 52a is solid, while inner mold section 52b is hollow. These molded sections are removed from molds 50and 50b, and may be seamed together to form an inner mold 52 having a solid section and a hollow section. Seaming of the inner mold sections is not necessary however; the sections may be floated independently in the outer mold.

By repeatedly casting inner molds from the original, it is possible to make numerous casts of the original object, until deterioration of the molds becomes a significant factor.

Casting of the final object is accomplished in essentially the same manner as a solid cast, with the cast material being catalyzed at a ratio consistent with the volume to be cast and the temperature and humidity conditions. Evacuation of the cast during the process is recommended but not necessary to the integrity of the process; sprues and runners can be used but are not recommended since their use may affect the surface of the cast object.

Mold types and materials are not critical to the process. They may be flexible or rigid, and integral or in any number of pieces. Mold materials and types are determined by the usage, complexity of the article to be copied, and number of reproductions. Similarly, the method of making the core pattern is not crucial since the molds of the core exist so that the core may be reproduced as many times as a cast is to be made.

What is claimed is:

1. A method for forming a cast replica of an article, comprising the steps of:
    forming an outer mold around said article with a first molding material, said outer mold having an inner surface substantially conforming to the outer surface of said article;
    separating said article from said outer mold;
    applying to said outer mold on its inner surface a predetermined thickness of a second molding material which is separable from said outer mold, said second molding material defining a hollow space at the interior thereof;
    filling the hollow space with a third molding material separable from said second molding material;
    allowing said third molding material to cure to form an inner mold;
    separating said second molding material from said outer mold and said inner mold;
    locating said inner mold or a reproduction thereof within said outer mold with a space between said outer mold and said inner mold or reproduction representing said predetermined thickness;
    filling the space between said inner mold or reproduction and said outer mold with a fourth molding material;
    allowing said fourth molding material to cure, forming said cast replica, and separating said cast replica from said outer mold.

2. A method according to claim 1, wherein said outer mold is split prior to separating said article.

3. A method according to claim 1, wherein said cast replica is separated from said inner mold.

4. A method according to claim 1, wherein said inner mold is fixed in said outer mold by bolting said inner mold to said outer mold separated by said predetermined distance.

5. A method according to claim 1, wherein said inner mold is formed with protruding keys on its surface, and said keys are utilized to locate said inner mold within said outer mold.

6. A method according to claim 1, wherein the step of filling the space between said inner mold and said outer mold takes place under at least a partial vacuum.

7. A method according to claim 1, wherein at least one reproduction of said inner mold is made, and said reproduction is located within said outer mold and used for forming a cast replica.

8. A method according to claim 7, wherein said reproduction is hollow, and is formed by casting at least two sections which are joined together.

9. A method according to claim 1, wherein said second molding material is clay, wax, or plaster.

10. A method according to claim 1, wherein said first molding material is plaster, polyester resin, fiberglass reinforced polyester resin, epoxy resin, silicone, or polyurethane.

11. A method according to claim 1, where said fourth molding material is polyester resin or epoxy resin.

12. A method according to claim 11, wherein said fourth molding material is reinforced with fiberglass.

13. A method according to claim 1, wherein said third molding material and said fourth molding material are substantially the same.

14. A method according to claim 1, wherein said inner mold is reinforced.

15. A method according to claim 1, wherein a parting layer is applied to the inner surface of the outer mold prior to the step of filling the space between the inner mold and the outer mold.

16. A method according to claim 1, wherein said predetermined thickness is about 2 to 20 mm.

17. A method according to claim 7, wherein said reproduction is formed by casting at least two sections separately.

18. A method according to claim 17, wherein at least one of said sections is solid and at least one of said sections is hollow.

19. A method according to claim 17, wherein said sections are joined together.

20. A method according to claim 17, wherein said sections are not joined together, and are independently located within said outer mold.

* * * * *